(12) United States Patent
Van Der Schaar (10) Patent No.: US 7,136,532 B2
(45) Date of Patent: Nov. 14, 2006

(54) FGS DECODER BASED ON QUALITY ESTIMATED AT THE DECODER

(75) Inventor: Mihaela Van Der Schaar, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 755 days.

(21) Appl. No.: 10/183,760

(22) Filed: Jun. 27, 2002

(65) Prior Publication Data

US 2004/0001635 A1  Jan. 1, 2004

(51) Int. Cl.
*G06K 9/36* (2006.01)
*G06K 9/46* (2006.01)

(52) U.S. Cl. ............... 382/233; 382/237; 382/166; 375/240.01; 375/240.25

(58) Field of Classification Search ............... 382/233, 382/237, 236, 166, 240, 245; 709/247; 375/240.1, 375/240.2, 240.03, 240.01, 240.12, 240.16, 375/240.25, 240.15
See application file for complete search history.

(56) References Cited

U.S. PATENT DOCUMENTS

| | | | |
|---|---|---|---|
| 5,748,903 A | 5/1998 | Agarwal | |
| 6,167,087 A * | 12/2000 | Kato | 375/240.03 |
| 6,173,012 B1 * | 1/2001 | Katta et al. | 375/240.15 |
| 6,553,072 B1 * | 4/2003 | Chiang et al. | 375/240.25 |
| 6,580,754 B1 * | 6/2003 | Wan et al. | 375/240.01 |
| 6,631,403 B1 * | 10/2003 | Deutsch et al. | 709/217 |
| 6,882,711 B1 * | 4/2005 | Nicol | 379/93.33 |
| 2002/0126752 A1 * | 9/2002 | Kim | 375/240.03 |
| 2003/0002579 A1 * | 1/2003 | Radha et al. | 375/240.1 |
| 2003/0058931 A1 | 3/2003 | Zhang et al. | |
| 2003/0072370 A1 * | 4/2003 | Girod et al. | 375/240.13 |
| 2003/0202579 A1 * | 10/2003 | Lin et al. | 375/240.03 |

FOREIGN PATENT DOCUMENTS

| | | |
|---|---|---|
| EP | 1158774 A2 | 11/2001 |
| EP | 1187370 A1 | 3/2002 |
| WO | WO00/35187 A1 | 6/2000 |

OTHER PUBLICATIONS

Wang et al, "Optimal Rate Allocation for Progressive Fine Granularity Salable Video Coding", Proceedings International Conference on Information Technology, Apr. 2, 2001, pp. 332-335.
Wee et al, "Secure Scalable Streaming Enabling Transcoding Without Decryption", Proceedings International Conference on Image Processing, Oct. 7-10, 2001, vol. 1 of 3, Conf. 8, pp. 437-440.

* cited by examiner

Primary Examiner—Jingge Wu
Assistant Examiner—Ali Bayat
(74) Attorney, Agent, or Firm—Larry Liberchuk (57) ABSTRACT

A method for decoding a stream of data includes the steps of: identifying a relationship (100) between quality of a decoded image and a bit rate for decoding the image; selecting a desired quality (110) of images to be decoded from the stream of data; determining a bit rate (112) corresponding to the desired quality using the relationship; and decoding a minimum number of bit-planes corresponding to the determined bit rate from the stream of data.

24 Claims, 6 Drawing Sheets

FGS DECODER BASED ON QUALITY ESTIMATED AT THE DECODER

FIELD OF THE INVENTION

The present invention relates to the implementation of a fine granular scalability (FGS) decoder.

BACKGROUND OF THE INVENTION

Video streaming over Internet Protocol (IP) networks has enabled a wide range of multimedia applications. Internet video streaming provides real-time delivery and presentation of continuous media content while compensating for the lack of Quality-of-Service (QoS) guarantees over the Internet. Due to the variation and unpredictability of bandwidth and other performance parameters (e.g., packet loss rate) over IP networks, in general, most of the proposed streaming solutions are based on some type of a layered (or scalable) video coding scheme.

Several video scalability approaches have been adopted by video compression standards such as MPEG-2, MPEG-4, and H.263. Temporal, spatial, and quality (SNR) scalability types have been defined in these standards. All of these types of scalable video include a Base Layer (BL) and one or more Enhancement Layers (ELs). The BL part of the scalable video stream represents, in general, the minimum amount of data needed for decoding that stream. The EL part of the stream represents additional information, and therefore enhances the video signal representation when decoded by the receiver.

Fine Granular Scalability (FGS) is a new video compression framework that has been recently adopted by the MPEG-4 standard for streaming applications. FGS is capable of supporting a wide range of bandwidth-variation scenarios that characterize IP-based networks, in general, and the Internet, in particular. Images coded with this type of scalability can be decoded progressively. That is, the decoder can start decoding and displaying the image after receiving a very small amount of data. As the decoder receives more data, the quality of the decoded image is progressively enhanced until the complete information is received, decoded, and displayed. Among lead international standards, progressive image coding is one of the modes supported in JPEG and the still-image, texture coding tool in MPEG-4 video.

Figure 5:
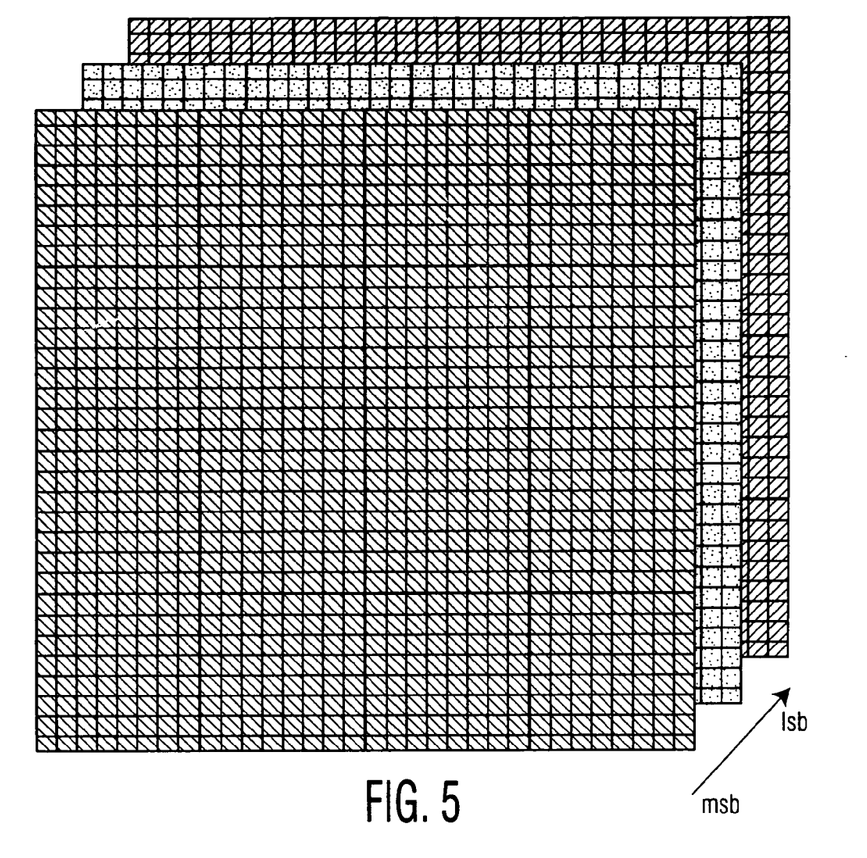
FIG. 5 is a diagram showing decoding of bit-planes, from the most significant bit to the least significant bit.

The EL compresses the SNR and temporal residual data using a progressive (embedded) codec. In this way, the FGS residual signal is compressed bit-plane by bit-plane, starting with the most significant bit-plane and ending with the least significant (see FIG. 5). In prior art decoders, the entire number of bit-planes received is decoded. FIG. 5 shows an example of such FGS enhancement-layer bit-planes, with progressive (Bit-plane by bit-plane) coding from the most significant bit (MSB) to the least significant bit (LSB), across the entire frame.

Alternatively, to reduce complexity, a decoder can stop decoding after a given number of bit-planes is received and decoded. For example, given a data rate constraint R and a frame rate fr, the decoder can be stopped after decoding R/fr bits per frame. However, discarding bit-planes in order to decrease the decoder complexity can lead to undesired visual quality. In addition, if decoding is stopped when the prescribed bit rate is exactly fulfilled (i.e., exactly R/fr bits are transmitted and decoded per frame), that number of bits will most likely correspond to a non-integer number of bit-planes. For example, the beginning of the image may have three bit-planes, while the end of the image has two bit-planes, leading to inconsistent quality within the same image or sequence.

An improved decoder is desired.

SUMMARY OF THE INVENTION

The invention includes a method and a decoder for decoding a stream of data. A relationship is identified between quality of a decoded image and a bit rate for decoding the image. A desired quality of images to be decoded from the stream of data is selected. A bit rate is determined corresponding to the desired quality using the relationship. A minimum number of bit-planes corresponding to the determined bit rate are decoded from the stream of data.

DETAILED DESCRIPTION

Discarding a fixed (and possibly integer) number of bit-planes in order to decrease the decoder complexity without taking into account the resulting visual image quality can lead to undesired reduction in visual quality.

Moreover, the effect on image quality obtained by discarding a fixed number of bit-planes depends on the sequence characteristics. For instance, sequences with high detail and low-motion are coded by FGS with many bits, and thus for example, discarding two bit-planes might have a considerably higher effect on image quality than discarding, for example, four bit-planes for an image with high motion and low frequency detail. Consequently, this might result in high quality fluctuations as the content changes.

In the exemplary embodiments of FIGS. 1–4, before deciding to discard bit-planes to reduce decoding complexity, the decoder takes into account the effect of discarding the bit-planes on image quality.

The embodiments of FIGS. 1–4 reduce the complexity of low-power, low-capability decoder devices for decoding FGS streams. The FGS decoder has an inherent complexity scalability feature, because a lower complexity is associated with decoding a smaller number of bit-planes. However, if a fixed number of entire bit-planes are always discarded, the resulting decoded image quality is unpredictable. In the embodiments of FIGS. 1–4, a method and a decoder are described that estimate the visual quality (e.g., in peak signal to noise ratio, PSNR) associated with decoding a certain number of bit-planes by using a base-layer quality-tag (e.g. PSNR). This allows reduction in the complexity of scalability while fulfilling a desired quality constraint.

In the exemplary embodiments, the quality of the FGS decoded images is determined at the decoder side (where the original image is not present), and subsequently, the decoder uses the computed quality to determine how many bit-planes can be discarded to reduce the complexity without lowering image quality below a desired quality level.

Figure 1:
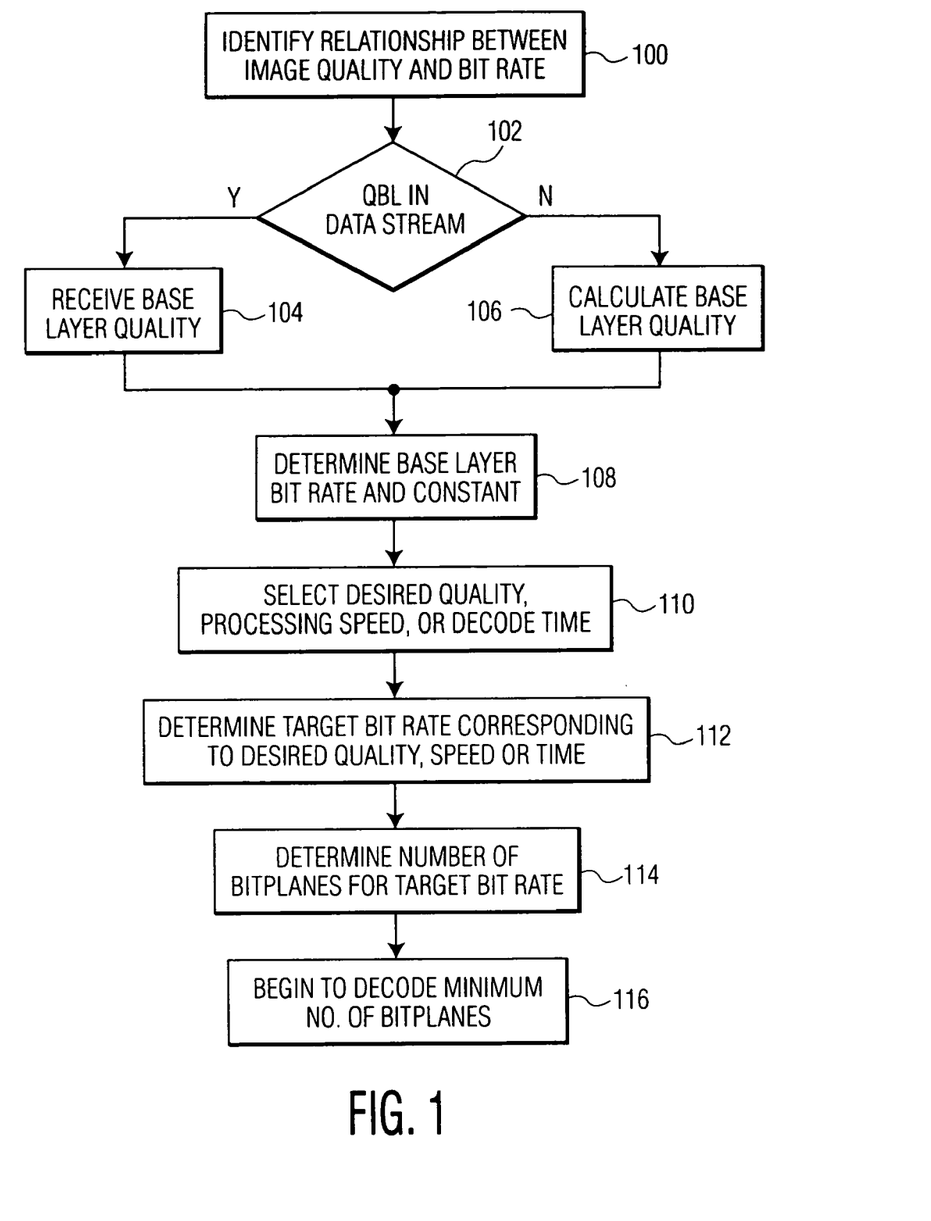
FIG. 1 is a flow chart diagram showing an exemplary embodiment of the invention.

FIG. 1 is a flow chart diagram of an exemplary embodiment of the invention. FIG. 1 shows a method and apparatus for decoding a stream of data.

At step 100, a relationship is identified between quality of a decoded image and a bit rate for decoding the image. An example of such a relationship is described further below in the section entitled, "Relationship Between Quality and Bit-Rate."

At step 102, if the value of the base-layer quality, QBL, at the base-layer bit-rate, RBL, is included in the data stream, then at step 104, the value of QBL can be received as side information (in the user data fields) by the decoder. Alternatively, if QBL is not in the data stream at step 102, then at step 106, QBL can be computed based on the decoding information available to the decoder, i.e., based on quantization steps, motion-vectors, macroblock prediction types, or combinations of the three. Note that QBL can be expressed either in terms of PSNR or using other subjective metric (i.e., objective metrics that have been correlated with subjective evaluations of image quality and tabulated). Other metrics may include, but are not limited to blockiness, sharpness, flicker noise.

At step 108, the other parameters that are used in the image quality calculation are determined. For example, for the relationship described further below, the additional parameters include the base layer bit-rate and the slope of the quality versus bit-rate curve.

At step 110, a selection is made of a desired quality of images to be decoded from the stream of data, a processing speed to be used, or a decoding time. An exemplary selection process is described below with reference to FIG. 3.

At step 112, a bit rate corresponding to the desired quality, speed or decoding time is determined using the relationship.

At step 116, decoding of a minimum number of bit-planes is begun, corresponding to the determined bit rate from the stream of data. The minimum number of bit-planes may be a real number corresponding to the calculated bit rate or the smallest integer greater than or equal to the calculated bit rate.

In some embodiments, the number of bit-planes decoded is dynamically adjusted within a single video sequence, to increase during a sequence of frames when there is higher detail, and decrease during a sequence of frames when there is lower detail. For example, preferably, each time a new scene change is detected (e.g., based on motion-vectors or the like), the base layer quality QBL is evaluated, and a determination is made whether a change in decoding bit rate is appropriate. It is contemplated that, when there is higher motion and lower frequency detail, more bit-planes can be discarded in these embodiments than would have been discarded if a fixed number of bit-planes is used for the entire video sequence.

Figure 2:
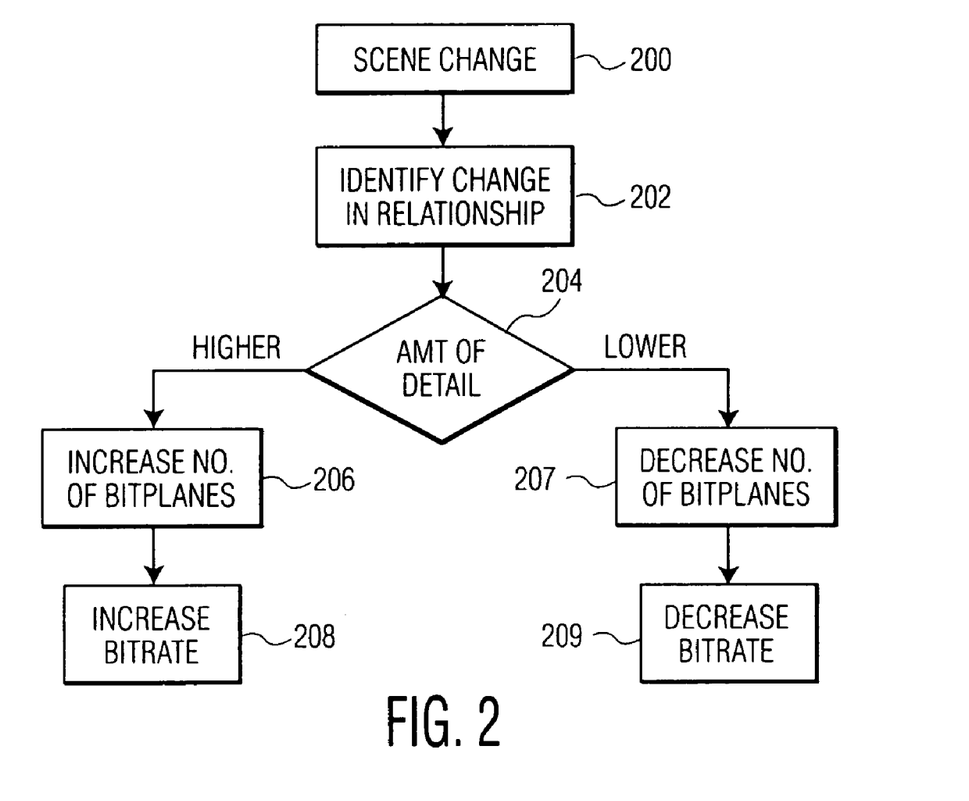
FIG. 2 is a flow chart diagram showing dynamic variation of bit rate in the embodiment of FIG. 1.

FIG. 2 is a flow chart diagram showing optional dynamic adjustment of the bit-rate in the exemplary embodiments. The steps of FIG. 2 may be automatically executed at appropriate times, for example upon detection of a scene change.

At step 200, a scene change is detected. Detection may be based on motion vectors, for example.

At step 202, a change in the relationship between image quality and bit-rate is identified. For example, a change in QBL may be identified.

At step 204, the amount of detail in the images is considered. If the amount of detail in the image increases, steps 206 and 208 are executed. If the amount of detail in the image decreases, steps 207 and 209 are executed. These steps dynamically adjust the number of bit-planes decoded to correspond to the desired quality and the changed relationship.

At step 206 for an image sequence having high detail, the number of bit-planes decoded is increased (and the number discarded decreased). At step 208, a relatively high bit rate is used.

At step 207 for an image sequence having low detail, the number of bit-planes decoded is decreased (and the number discarded increased). At step 209, a relatively low bit rate is used.

Although FIG. 2 shows a dynamic adjustment technique, in other embodiments, there may be no dynamic adjustment; the number of bit-planes to be discarded may be determined once for each image sequence, and remain constant throughout that sequence. In such a case, the value of QBL may be based on the first frame of the sequence, or on some type of average. For an average value of QBL, motion vectors between subsequent frames can be used to determine the amount of motion within the sequence.

Figure 3:
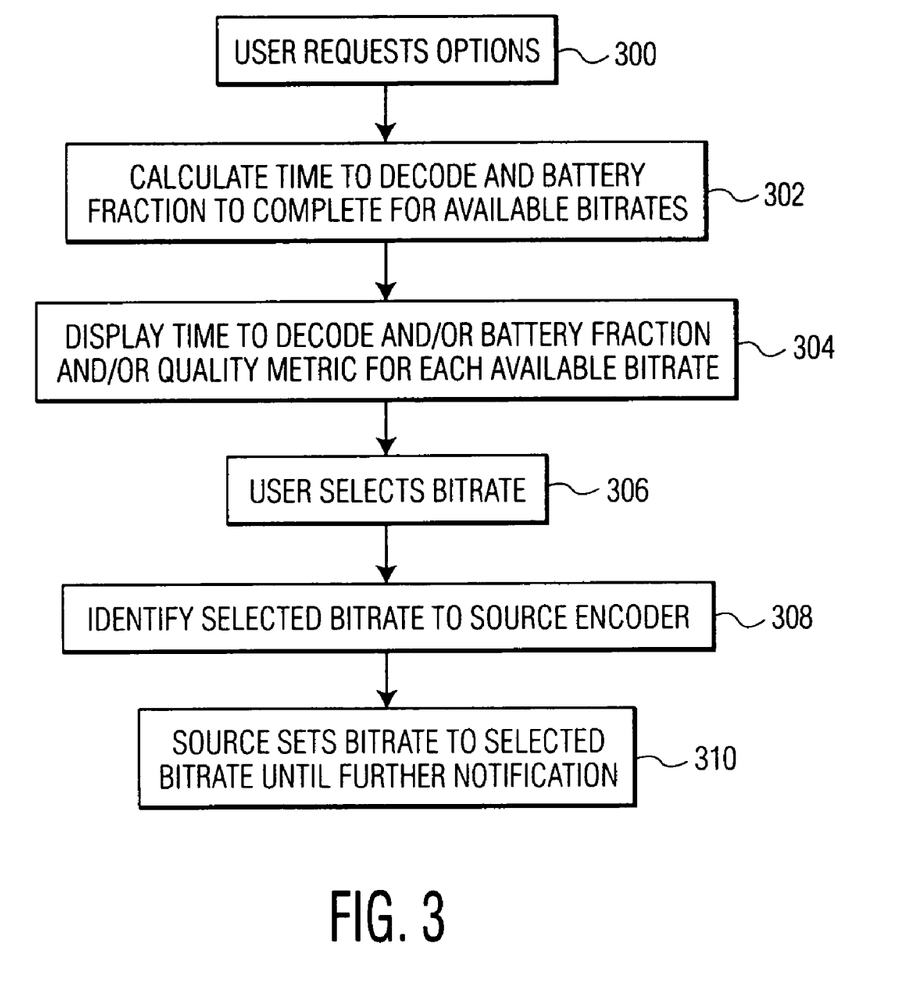
FIG. 3 is a flow chart diagram showing user interaction with control of the embodiment of FIG. 1.

FIG. 3 is a flow chart diagram of an exemplary optional user interaction with the decoding process and decoder.

At step 300, the user requests a menu of image quality or decoding complexity options. The user may make such a request by selecting the menu from a higher level menu of functions and controls in the particular device containing the decoder.

At step 302, the device containing the decoder displays at least two values of image quality and a respective measure of a resource required to decode the image for each of the at least two values of image quality. Any number of quality-resource measure pairs may be displayed, but preferably, only possible combinations should be displayed. For example, an image quality value corresponding to a decoding time that exceeds the capacity of the battery of the device containing the decoder should not be displayed as an option. The displayed resource measure may be the time to decode the stream of data with the respective image quality, a fraction of battery charge used to decode the stream of data at the respective image quality, or a bit rate used to decode the stream of data at the respective image quality.

At step 306, the user selects one of the pairs, which results in a selection of a decoding bit-rate (even if the bit-rate is not the resource measure displayed to the user in step 302).

At step 308, the decoder may optionally transmit the determined bit rate to a source of the stream of data, requesting that the source of the stream of data only transmit future streams of data at the determined bit rate. If this option is included, then at step 310, the source of the data stream can set its transmitted bit-rate to the bit-rate requested by the decoder.

Alternatively, the decoder can omit step 308, and discard any bit-planes that are not desired to be decoded by the user.

Using the techniques of FIG. 3, the user or the terminal (automatically) can either select a desired quality or a desired processing power. The user can manually adjust the fixed quality setting QFIX, for example, to lengthen the remaining battery time or to improve image quality. The device can easily trade image quality for battery time based on user request or a predetermined quality agreement or it can maximize battery time by reducing image quality as low as QBL (i.e., by lowering the bit rate to RBL).

For example, such a feature can exist at the mobile terminal where, based on the selected quality, the device can inform the user how much battery time is still left for streaming applications using FGS. Assume that in a simple mobile device, the battery level is monitored, which corresponds to an approximate amount of time that the mobile device can be operated without recharging the battery. An average time to decode a given amount of data in the mobile device can be estimated. (This average could be estimated as a composite of both base layer and enhancement layer decoding time.) By specifying a transmission rate R, the user controls the amount of data decoded, and thus the amount of time that the mobile device must spend decoding a given stream. The mobile unit can compare the amount of operating time left on the battery with the predicted amount of time needed to decode a stream at either rate, and present the information to the user, either in minutes, or as a percentage of the total battery capacity. The user can then select the rate based on this information.

Figure 4:
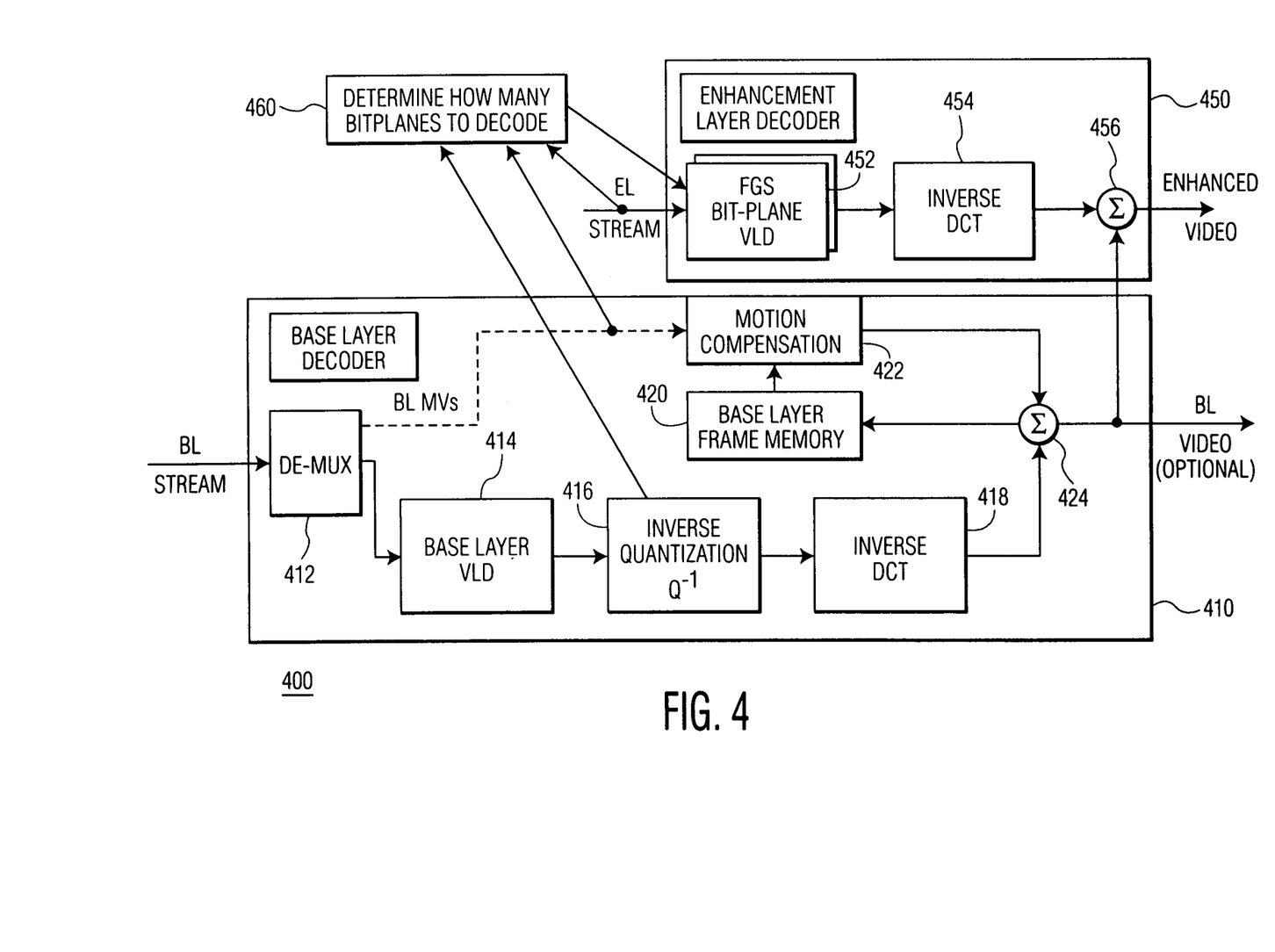
FIG. 4 is a block diagram of a decoder embodying an aspect of the invention.

FIG. 4 is a block diagram of an exemplary embodiment featuring a decoder 400. Decoder 400 has a base layer decoder 410 and an enhancement layer decoder 450. BL decoder 410 includes a demultiplexer that receives the BL bitstream and provides the encoded discrete cosine transform (DCT) coefficient data to a BL variable length decoder (VLD) 414 and provides BL motion vectors (MVs) to a motion compensation block 422. The BL VLD 414 provides decoded data to inverse quantization block 416, which outputs the DCT coefficient data to inverse DCT block 418. Inverse DCT block 418 performs the inverse DCT operation and provides video frames to adder 424. The motion compensation block 422 receives the BL MVs and BL frame data from the BL frame memory 420, and performs motion compensation on the BL frames in memory 420 to provides additional frames to the adder 424. The decoded BL data stream is output from adder 424 to the BL frame memory 420 and the EL decoding section 450.

The EL decoder 450 has an FGS bit-plane VLD 452 that receives the EL bitstream and provides DCT coefficient data to the inverse DCT block 454. The inverse DCT block 454 performs the inverse DCT operation and outputs the EL frame data that are added to the BL data in adder 456 to provide an enhanced video stream.

Decoder 400 includes an additional block 460 that determines how many bit-planes to decode. Block 460 receives information from the inverse quantization block 416, the BL motion vectors, and the EL bitstream, and provides a number of bit-planes to be decoded to the FGS bit-plane VLD. The operation of block 460 may be as shown in FIGS. 1–3 and described above.

Relationship Between Quality and Bit Rate

Figure 6:
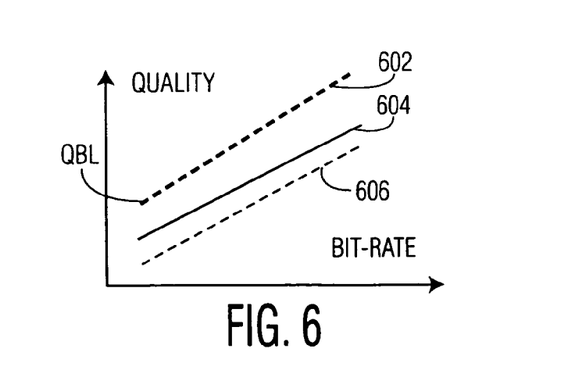
FIG. 6 is a diagram showing how image quality varies with bit rate for a variety of image sequences.

Various rate-distortion curves are shown in FIG. 6 for various sequences 602, 604, and 606 coded within the same range of bit rates. In each of the curves in FIG. 6, the leftmost point corresponds to the base layer bit rate, and the corresponding quality QBL. From FIG. 6, two observations can be made:

(1) The base-layer quality QBL has a large influence on the overall quality of the FGS-streams.

(2) The FGS-quality increases almost linearly as a function of the bit-rates.

An exemplary function is set forth below that can be used to determine a bit-rate that will provide a desired image quality, given a base layer image quality and base layer image rate. This function takes advantage of empirical observations to provide a quality computation that is quickly performed with a small number of arithmetic operations. Other functions may be determined by one of ordinary skill in the art to calculate the desired bit-rate.

The quality of an FGS stream Q at rate R, can be modeled as:

$$Q(R)=QBL+(R-RBL)/c,$$

where QBL is the base-layer quality, RBL is the base-layer bit-rate, c is a constant experimentally found to equal RBL (i.e., the slope of the FGS rate-distortion function is experimentally found to have a slope of about 45 degrees).

Typically, the value of the term (R−RBL)/c is less than ten. The base layer quality QBL is strongly dependent on the base layer bit rate RBL. For example, for high detail, low motion sequences of CIF resolution images, with RBL=100 kbps, then QBL (in PSNR)~25–28 dB For low detail, high motion sequences of CIF resolution images with RBL=100 kbps, QBL (in PSNR)~32–35 dB. Thus, the large influence of QBL on the overall image quality is apparent.

Then, if decoder complexity/power consumption is to be reduced while keeping the quality Q(R) at a constant value QFIX at all times (independent of the sequence characteristics), a number of bit-planes corresponding to the rate R1 should be only decoded. R1 can be computed from the formula:

$$QFIX=Q(R1)=QBL+(R1-RBL)/c=QBL+(R1-RBL)/RBL$$

The value R1 corresponding to the pre-set QFIX can be easily computed since the quality of an FGS stream Q at rate R (as described above) is a linear function.

The complexity saving associated with this strategy can also be a-priori computed on average for a large set of sequences. Then, a quality versus average complexity table can be stored and used at the (proprietary) decoder. For any given Quality QFIX, base layer bit-rate RBL, encoding frame-rate and spatial-resolution, this table provides an average complexity factor.

Figure 7:
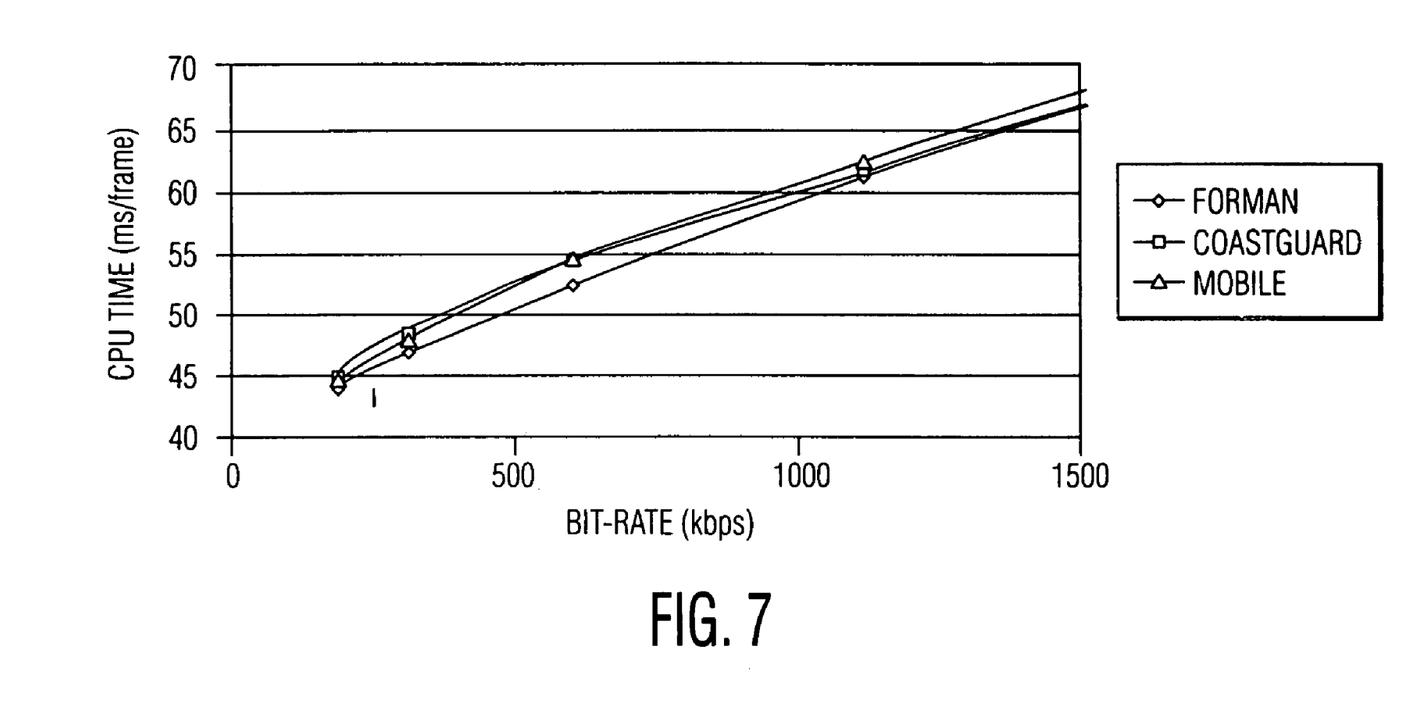
FIG. 7 is a diagram showing how decoding complexity varies with the bit rate of the stream that is decoded, for a variety of image sequences.

For example, complexity may be measured by the average CPU time (in milliseconds per frame) required to decode the sequence. There is no single complexity factor relationship for all computing platforms, since this strongly depends on the specific implementation platform and optimization algorithm. However, typically, the complexity does not depend on the sequence characteristics but rather only depends on the bit rate R. FIG. 7 shows an example with three different image sequences. The complexity is shown by the number of milliseconds per frame to decode the sequences, as a function of the bit rate. The complexity is highly correlated with the bit rate, and the relationship is nearly linear. There is little variation among the sequences.

The exemplary embodiments are especially useful for products such as wireless terminals, such as mobile-phones, personal computers, television set-top boxes, storage devices, digital video cameras, (in-home) transcoding gateways and the like. The exemplary embodiments may be used in services, such as video-conferencing, real-time video decoding/streaming, storage applications and the like. This list is not exclusive, and other applications for the exemplary decoding technique are also contemplated.

The present invention may be embodied in the form of computer-implemented processes and apparatus for practicing those processes. The present invention may also be embodied in the form of computer program code embodied in tangible media, such as random access memory (RAM), floppy diskettes, read only memories (ROMs), CD-ROMs, DVD-ROMs, hard drives, high density (e.g., "ZIP™" or "JAZZ™") removable disks, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits. Alternatively, the decoder may be implemented in specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for decoding a stream of data, comprising:
   identifying a relationship between quality of a decoded image and a bit rate for decoding the image;
   selecting a desired quality of images to be decoded from the stream of data;
   determining a bit rate corresponding to the desired quality using the relationship;
   decoding a minimum number of bit-planes corresponding to the determined bit rate from the stream of data;
   identifying a change in the relationship; and
   dynamically adjusting the number of bit-planes decoded to correspond to the desired quality and the changed relationship.

2. The method of claim 1, wherein the relationship is defined by the equation:

$$Q(R)=QBL+(R-RBL)/c,$$

where Q(R) is the quality of the image at a bit rate R, QBL is a quality measure of a base layer of the data stream, RBL is a bit rate corresponding to transmission of the base layer, and c is a constant.

3. The method of claim 1, further comprising using a relatively low bit rate for an image sequence having low detail.

4. The method of claim 1, wherein the change in the relationship is identified and the number of bit-planes decoded is dynamically adjusted when a scene change is detected.

5. The method of claim 1, comprising displaying at least two values of image quality and a respective measure of a resource required to decode the image for each of the at least two values of image quality.

6. The method of claim 1, further comprising transmitting the determined bit rate to a source of the stream of data, wherein the source of the stream of data is requested to only transmit future streams of data at the determined bit rate.

7. A computer readable medium having computer program code encoded thereon, wherein, when the computer program code is executed by a processor, the processor executes a method for decoding a stream of data, comprising:
   identifying a relationship between quality of a decoded image and a bit rate for decoding the image;
   selecting a desired quality of images to be decoded from the stream of data;
   determining a bit rate corresponding to the desired quality using the relationship;
   decoding a minimum number of bit-planes corresponding to the determined bit rate from the stream of data;
   identifying a change in the relationship; and
   dynamically adjusting the number of bit-planes decoded to correspond to the desired quality and the changed relationship.

8. The computer readable medium of claim 7, wherein the relationship is defined by the equation:

$$Q(R)=QBL+(R-RBL)/c,$$

where Q(R) is the quality of the image at a bit rate R, QBL is a quality measure of a base layer of the data stream, RBL is a bit rate corresponding to transmission of the base layer, and c is a constant.

9. The computer readable medium of claim 8, wherein c is approximately equal to RBL.

10. The computer readable medium of claim 8, further comprising receiving a value of QBL from a source of the data stream.

11. The computer readable medium of claim 8, further comprising computing QBL based on one or more of the group consisting of quantization steps, motion-vectors, and macroblock prediction types.

12. The computer readable medium of claim 7, wherein the minimum number of bit-planes is one of the group consisting of a real number corresponding to the determined bit rate and a smallest integer greater than or equal to the determined bit rate.

13. The computer readable medium of claim 7, further comprising using a relatively high bit rate for an image sequence having high detail and low motion.

14. The computer readable medium of claim 7, further comprising using a relatively low bit rate for an image sequence having relatively low detail.

15. The computer readable medium of claim 7, wherein the change in the relationship is identified and the number of bit-planes decoded is dynamically adjusted when a scene change is detected.

16. The computer readable medium of claim 7, further comprising displaying at least two values of image quality and a respective measure of a resource required to decode the image for each of the at least two values of image quality.

17. The computer readable medium of claim 16, wherein the measure of the resource is one of the group consisting of a time to decode the stream of data with the respective image quality, a fraction of battery charge used to decode the stream of data at the respective image quality, and a bit rate used to decode the stream of data at the respective image quality.

18. The computer readable medium of claim 7, further comprising transmitting the determined bit rate to a source of the stream of data, and the source of the stream of data is requested to only transmit future streams of data at the determined bit rate.

19. A decoder for decoding a stream of data, comprising:
   means for receiving a selection of a desired quality of images to be decoded from the stream of data;
   means for determining a bit rate for decoding the image based on a quality of a decoded image, the determining means providing a desired bit rate corresponding to the desired quality;

means for controlling a number of bit-planes to be decoded, so that a minimum number of bit-planes are decoded to form one or more images, corresponding to the desired bit rate from the stream of data;

means for identifying a change in a relationship between the bit rate and the quality of the decoded image; and means for dynamically adjusting the number of bit-planes decoded to correspond to the desired quality and the changed relationship.

20. The decoder of claim 19, wherein the adjusting means uses a relatively low bit rate for an image sequence having relatively low detail.

21. The decoder of claim 19, wherein the change identifying means identifies a change in the relationship when a scene change is detected.

22. The decoder of claim 19, wherein the decoder is included in a mobile device that displays at least two values of image quality and a respective measure of a resource required to decode the image for each of the at least two values of image quality.

23. The decoder of claim 22, wherein the measure of the resource is one of the group consisting of a time to decode the stream of data with the respective image quality, a fraction of battery charge used to decode the stream of data at the respective image quality, and a bit rate used to decode the stream of data at the respective image quality.

24. The decoder of claim 19, wherein the decoder is included in a mobile device that transmits the determined bit rate to a source of the stream of data, so as to request that the source of the stream of data only transmit future streams of data at the determined bit rate.

* * * * *